US012656743B2

(12) United States Patent
Kyou

(10) Patent No.: US 12,656,743 B2
(45) Date of Patent: Jun. 16, 2026

(54) ELECTRONIC TIMEPIECE, WIRELESS DEVICE, WIRELESS COMMUNICATION SYSTEM, TIME CORRECTION METHOD, AND NON-TRANSITORY RECORDING MEDIUM

(71) Applicant: CASIO COMPUTER CO., LTD., Tokyo (JP)

(72) Inventor: Kazuho Kyou, Tachikawa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 1098 days.

(21) Appl. No.: 17/180,927

(22) Filed: Feb. 22, 2021

(65) Prior Publication Data

US 2021/0263480 A1 Aug. 26, 2021

(30) Foreign Application Priority Data

Feb. 25, 2020 (JP) ................................. 2020-029852

(51) Int. Cl.
*G04R 20/26* (2013.01)
*H04L 7/00* (2006.01)
(52) U.S. Cl.
CPC ................ *G04R 20/26* (2013.01); *H04L 7/00* (2013.01)
(58) Field of Classification Search
CPC ........ G04R 20/26; G04R 20/08; G04R 20/14; G04R 20/02; H04L 7/00; H04W 76/10
See application file for complete search history.

(56) References Cited

U.S. PATENT DOCUMENTS

| | | | |
|---|---|---|---|
| 8,665,913 B2 * | 3/2014 | Maekawa | H04L 43/0864 709/248 |
| 2017/0255170 A1 * | 9/2017 | Morohoshi | G04C 3/001 |
| 2018/0074465 A1 * | 3/2018 | Kitamura | G04C 3/146 |
| 2018/0267484 A1 * | 9/2018 | Morohoshi | G04C 17/0066 |
| 2019/0289654 A1 * | 9/2019 | Ihashi | G04G 21/04 |

FOREIGN PATENT DOCUMENTS

| | | |
|---|---|---|
| CN | 1987687 A | 6/2007 |
| CN | 107817677 A | 3/2018 |
| JP | 2002027555 A | 1/2002 |
| JP | 2002300640 A | 10/2002 |
| JP | 2002357681 A | 12/2002 |

(Continued)

OTHER PUBLICATIONS

Notice of Reasons for Refusal dated Mar. 22, 2022 received in Japanese Patent Application No. JP 2020-029852 together with an English language translation.

(Continued)

*Primary Examiner* — Edwin A. Leon
*Assistant Examiner* — Kevin Andrew Johnston
(74) *Attorney, Agent, or Firm* — Scully, Scott, Murphy & Presser, P.C.

(57) ABSTRACT

Time is appropriately corrected without needlessly consuming power. In step S101 and step S102, a CPU of an electronic timepiece determines whether to correct a time measured by a timekeeping circuit. Then, when a determination is made to correct the time measured by the timekeeping circuit, in step S111 and step S112, the time measured by the timekeeping circuit is corrected on the basis of time information held by a wireless device.

11 Claims, 8 Drawing Sheets

(56)                 References Cited

FOREIGN PATENT DOCUMENTS

| | | | |
|----|----|----|----|
| JP | 2003344572 A | 12/2003 | |
| JP | 2010081381 A | 4/2010 | |
| JP | 2017-227533 A | 12/2017 | |
| JP | 2018-100912 A | 6/2018 | |
| JP | 2019-068292 A | 4/2019 | |
| JP | 2019207213 A | * 12/2019 | ............ G04R 20/28 |

OTHER PUBLICATIONS

First Office Action dated Mar. 2, 2022 received in Chinese Patent Application No. CN 202110214496.2 together with an English language translation.
Notice of Reasons for Refusal dated May 31, 2022 received in Japanese Patent Application No. JP 2020-029852 together with an English language translation.

* cited by examiner

ELECTRONIC TIMEPIECE, WIRELESS DEVICE, WIRELESS COMMUNICATION SYSTEM, TIME CORRECTION METHOD, AND NON-TRANSITORY RECORDING MEDIUM

CROSS-REFERENCE TO RELATED APPLICATION

This application is based upon and claims the benefit of priority under 35 USC 119 of Japanese Patent Application No. 2020-029852 filed on Feb. 25, 2020, the entire disclosure of which, including the description, claims, drawings, and abstract, is incorporated herein by reference in its entirety.

FIELD

The present disclosure relates generally to an electronic timepiece, a wireless device, a wireless communication system, a time correction method, and a non-transitory recording medium.

BACKGROUND

In recent years, electronic timepieces have been developed that are capable of wirelessly communicating with wireless devices such as smartphones. Among the various electronic timepieces that communicate wirelessly with wireless devices, there are electronic timepieces that, when a communication connection with a wireless device is established, acquire time information that is more correct from the wireless device and correct, on the basis of that time information, time information held by the electronic timepiece (see, for example, Unexamined Japanese Patent Application Publication No. 2018-100912).

SUMMARY

An electronic timepiece according to one aspect of the present disclosure includes: a receiver that communicates wirelessly with a wireless device, and that receives time information from the wireless device;
    a timekeeping circuit that measures time; and
    at least one processor;
wherein
    the processor is configured to execute
        a determination operation in which, when a communication connection with the wireless device is established via the receiver, a determination is made whether correction of the time measured by the timekeeping circuit is needed, and
        a correction operation in which, when, in the determination operation, a determination is made that correction of the time measured by the timekeeping circuit is needed, the time measured by the timekeeping circuit is corrected based on the time information acquired from the wireless device and, when, in the determination operation, a determination is not made that correction of the time measured by the timekeeping circuit is needed, the time measured by the timekeeping circuit is not corrected.

BRIEF DESCRIPTION OF THE DRAWINGS

A more complete understanding of this application can be obtained when the following detailed description is considered in conjunction with the following drawings, in which.

DETAILED DESCRIPTION

Figure 1:
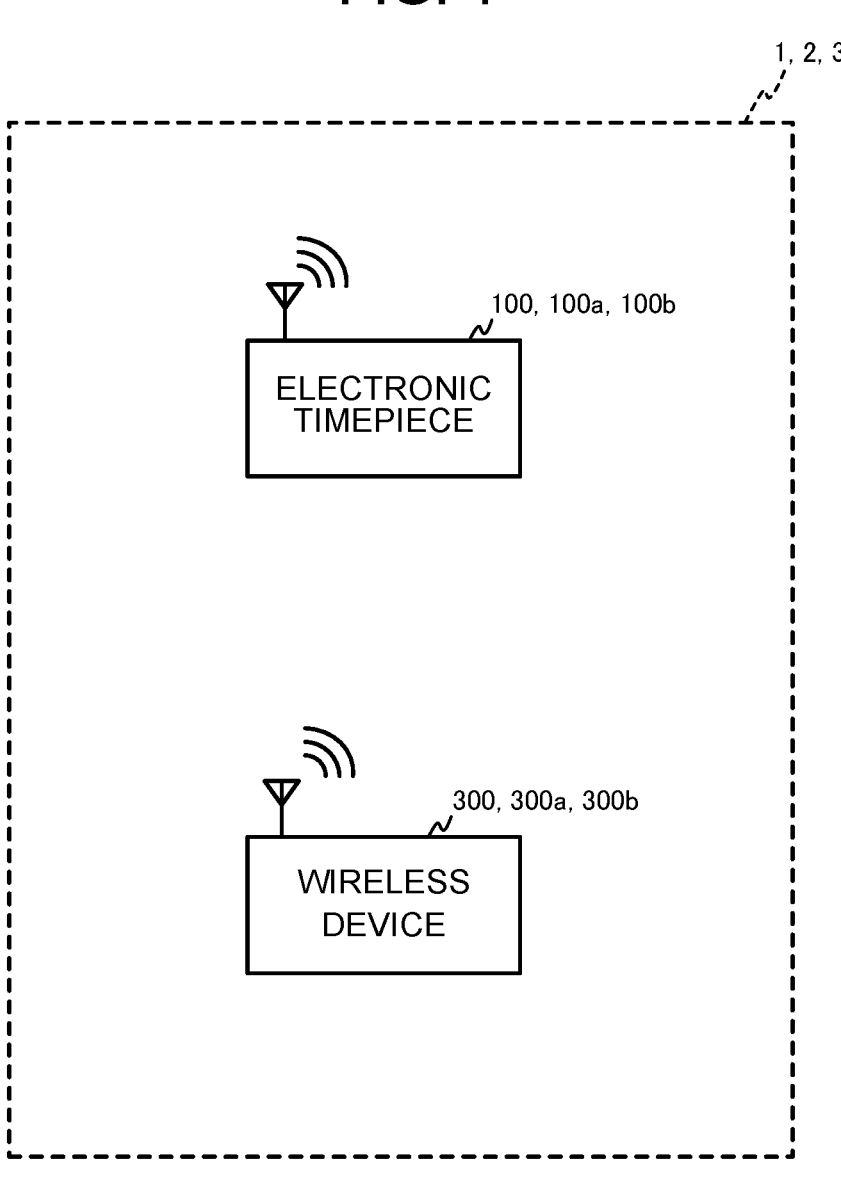
FIG. 1 is a schematic drawing illustrating a configuration example of a wireless communication system according to Embodiments 1 to 3.

Hereinafter, embodiments according to the present disclosure are described while referencing the drawings. Note that, in the drawings, identical or equivalent components are denoted by the same reference numerals.

Embodiment 1

As illustrated in FIG. 1, a wireless communication system 1 according to Embodiment 1 includes an electronic timepiece 100 and a wireless device 300. The electronic timepiece 100 includes, as a fundamental function, a function for displaying a current time. The wireless device 300 is a smartphone that includes, for example, a mobile phone function. The wireless device 300 can acquire correct time information (for example, time information corresponding to Japan Standard Time) from a mobile phone base station or from a time server on the internet via the base station.

In the wireless communication system 1, the electronic timepiece 100 and the wireless device 300 communicate wirelessly with each other on the basis of a short-range wireless communication standard called Bluetooth (registered trademark) Low Energy (hereinafter referred to as "BLE"), for example. The electronic timepiece 100 acquires, by wireless communication, correct time information held by the wireless device 300, and corrects (updates) the time information held by the electronic timepiece 100 on the basis of the acquired time information. In one example, the electronic timepiece 100 corrects, on the basis of the time information of the wireless device 300, the time information of the electronic timepiece 100 at a timing at which a communication connection with the wireless device 300 is established.

In some cases, the electronic timepiece 100 is set to an always connected mode in which a communication connection with the wireless device 300 is always established, or maintenance of that communication connection is always attempted. The wireless communication system 1 can realize various advantageous functions as a result of the electronic timepiece 100 being set to the always connected mode and a communication connection being always established between the electronic timepiece 100 and the wireless device 300.

Note that, the electronic timepiece 100 and the wireless device 300 exchange a large amount of information within a certain amount of time immediately after the communication connection between the electronic timepiece 100 and the wireless device 300 is established. As such, immediately after the communication connection is established, communication is performed on a relatively short time interval such as 50 ms, for example. The time interval of the wireless communication is also called a "connection interval." In the always connected mode, after the communication connection is established and necessary information is exchanged, the connection interval is set to a longer interval and the electronic timepiece 100 and the wireless device 300 carry out communication on an interval such as 300 ms, for example. By setting a longer connection interval, the amount of information exchanged between the electronic timepiece 100 and the wireless device 300 within the certain amount of time is reduced, but power consumption can be suppressed.

Even if the electronic timepiece 100 is set to the always connected mode, the communication connection between the electronic timepiece 100 and the wireless device 300 may be disconnected due to a poor communication environment, for example. Herein, such a disconnection is referred to as a "link loss." Link losses may occur in cases such as when the physical distance between the electronic timepiece 100 and the wireless device 300 increases, and when the radio waves used for the wireless communication are blocked or interfered with.

When a link loss occurs, the electronic timepiece 100 continuously emits a signal (advertising signal) requesting the establishment of a communication connection, and attempts to establish a communication connection with the wireless device 300 (recover from the link loss). When the cause of the link loss is eliminated and the wireless device 300 is able to receive the advertising signal, a communication connection is re-established between the electronic timepiece 100 and the wireless device 300.

In a case in which the electronic timepiece 100 is set to the always connected mode and link losses occur frequently, establishment and disconnection of the communication connection between the electronic timepiece 100 and the wireless device 300 is repeated multiple times in a short amount of time. In such a case, the time information of the electronic timepiece 100 is corrected each time the communication connection is established (is recovered from the link loss) and, consequently, power is consumed.

As such, it is preferable that, when a communication connection is established between the electronic timepiece 100 and the wireless device 300, the time information of the electronic timepiece 100 is corrected under appropriate conditions. Hereinafter, examples of such appropriate conditions are described.

For example, it is assumed that time correction of the electronic timepiece 100 is performed at 1:00 PM on Jan. 1, 2020. A case is assumed in which the electronic timepiece 100 is set to always connected mode, a link loss occurs at 2:00 PM on Jan. 1, 2020, the link loss is resolved at 3:00 PM on Jan. 1, 2020, and the communication connection between electronic timepiece 100 and the wireless device 300 is re-established. Only two hours has elapsed from when the time information of the electronic timepiece 100 is corrected to when the link loss occurs and the communication connection is re-established. In such a case, it is thought that the time information of the electronic timepiece 100 will be relatively correct (for example, close to Japan Standard Time) and, as such, even though the communication connection with the wireless device 300 is recovered from the link loss and re-established, the time information of the electronic timepiece 100 is not corrected.

Meanwhile, a case is assumed in which the electronic timepiece 100 is set to always connected mode, time correction of the electronic timepiece 100 is performed at 1:00 PM on Feb. 1, 2020, a link loss occurs at 2:00 PM on Feb. 1, 2020, the link loss is resolved at 3:00 PM on Feb. 2, 2020, and the communication connection between electronic timepiece 100 and the wireless device 300 is re-established. At least 24 hours have elapsed from when the time information of the electronic timepiece 100 is corrected to when the link loss occurs and the communication connection is re-established. In such a case, there is a possibility that the time information of the electronic timepiece 100 will be incorrect (for example, deviates from Japan Standard Time). As such, when the communication connection with the wireless device 300 is recovered from the link loss and re-established, the time information of the electronic timepiece 100 is corrected on the basis of the time information of the wireless device 300.

Thus, when a communication connection between the electronic timepiece 100 and the wireless device 300 is established, a determination is made, in accordance with the amount of time that has elapsed since the time information of the electronic timepiece 100 was most recently corrected, about whether or not to correct the time information of the electronic timepiece 100. Introducing such a condition makes it possible to appropriately perform time correction of the electronic timepiece 100 while suppressing power consumption. Hereinafter, a detailed description is given of a wireless communication system 1 provided with such a feature.

Figure 2A:
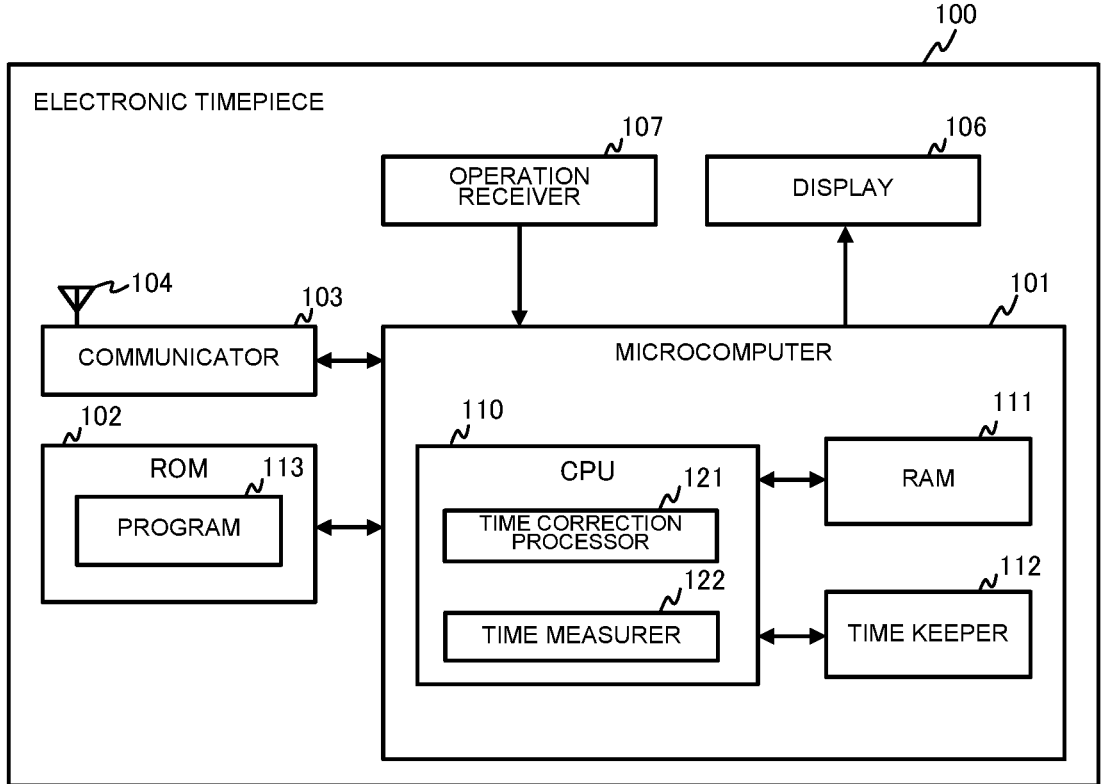
FIG. 2A is a block diagram illustrating the configuration of an electronic timepiece according to Embodiment 1.

Firstly, the hardware configuration of the electronic timepiece 100 according to Embodiment 1 is described. As illustrated in FIG. 2A, the electronic timepiece 100 includes, as a hardware configuration, a microcomputer 101, a read-only memory (ROM) 102, a communicator (receiver) 103 including an antenna 104, a display 106, and an operation receiver (operation receiving device) 107.

The microcomputer 101 includes a central processing unit (CPU) 110 as a processor, a random-access memory (RAM) 111 as a memory, a time keeper (time keeping circuit) 112, and the like. Note that the RAM 111 and the time keeper 112 may be provided outside the microcomputer 101. Additionally, the ROM 102 and the communicator 103 (including the antenna 104) may be provided in the microcomputer 101.

The CPU 110 is a processor that carries out various types of arithmetic processing and overall control of all operations of the electronic timepiece 100. The CPU 110 reads control programs from the ROM 102 and loads the control programs into the RAM 111 to carry out various types of operation processing such as arithmetic control and displaying related to various types of functions. In one example, the CPU 110 controls the communicator 103 in accordance with a control program to establish a communication connection with the wireless device 300, transmit information to the wireless device 300, and/or receive information from the wireless device 300. Furthermore, the CPU 110 corrects the time measured by the time keeper 112, for example.

The RAM 111 is volatile memory such as static random access memory (SRAM) or dynamic random access memory (DRAM). The RAM 111 stores temporary data, various types of setting data, and the like.

The time keeper 112 includes an oscillation circuit, a frequency dividing circuit, a time keeping circuit, and the like, and measures the current time. Note that the time keeping 112 may be configured from software that changes a value stored in the RAM 111 every predetermined amount of time (for example, every one second), or may be configured from dedicated hardware.

The ROM 102 is nonvolatile memory such as mask ROM or flash memory. Control programs, initial setting data, and the like are stored in the ROM 102. The control programs include a program 113 related to the control of the correction of the time measured by the time keeper 112, the control of the various types of processing for controlling wireless communication with the wireless device 300, and the like.

In one example, the communicator 103 includes a radio frequency (RF) circuit and/or a baseband (BB) circuit. The communicator 103 is also called a "wireless communicator." The communicator 103 demodulates and/or decrypts the wireless signals received via the antenna 104, and transmits these wireless signals to the CPU 110. Moreover, the communicator 103 encrypts and/or modulates signals sent from the CPU 110 and transmits these signals out via the antenna 104. In one example, the communicator 103 is realized by a Bluetooth (registered trademark) controller that carries out BLE-based transmitting and receiving of wireless signals.

The display 106 mainly displays, by an analog method, a digital method, or the like, the current time measured by the time keeper 112 in a manner that is recognizable by a human. Other than the current time, the display 106 may display information received from the wireless device 300, for example.

In one example, the operation receiver 107 includes a sensor, a button, a switch, or the like, receives input operations from a user, and outputs electronic signals, corresponding to the input operations, to the microcomputer 101. The operation receiver 107 may, for example, include a touch sensor provided integrally with the display 106, and constitute a touch panel display together with the display 106. The operation receiver 107 receives an operation for setting the electronic timepiece 100 to the always connected mode, or an operation for canceling the always connected mode, for example. Additionally, the operation receiver 107 receives an operation for immediately correcting the time information of the electronic timepiece 100, for example.

Next, the functional configuration of the CPU 110 of the electronic timepiece 100 is described. The CPU 110 mainly functions as a time correction processor 121 and a time measurer 122. The functions of the time correction processor 121 and the time measurer 122 may be realized by a processor other than the microcomputer 101. For example, the functions of the time correction processor 121 and the time measurer 122 may be realized by the CPU of the communicator 103.

Firstly, the CPU 110 as the time correction processor 121 controls the communicator 103 to establish a communication connection with the wireless device 300 and, upon establishment of the communication connection, executes a determination operation for determining whether or not to correct the time measured by the time keeper 112. Then, in a case in which a determination is made to correct the time measured by the time keeper 112, the CPU 110 as the time correction processor 121 executes a correction operation for acquiring the time information from the wireless device 300, and correcting the time measured by the time keeper 112 on the basis of the acquired time information.

The CPU 110 as the time measurer 122 executes a measuring operation for measuring the amount of time that has elapsed since the time information was most recently corrected in the past. For example, when the time information is corrected, "0" is written in an elapsed time storage region of the RAM 111, and "1" is added to the value stored in the elapsed time storage region each time one second elapses. As a result, the amount of time that has elapsed since the time information was most recently corrected is measured.

When functioning as the time correction processor 121, the CPU 110 references the elapsed time since the time information was most recently corrected, measured by the time measurer 122. Then, the CPU 110 determines, on the basis of the elapsed time, whether or not to correct the time measured by the time keeper 112.

Note that the time measurer 122 may be replaced with a time setter. The CPU 110 as the time setter executes a setting operation for setting a time corresponding to a future point in time when the time information is corrected. For example, a time 24 hours after the time information is corrected is set. In a case in which the time measurer 122 is replaced with the time setter, when the CPU 110 functions as the time correction processor 121, the CPU 110 determines, on the basis of whether or not the current time measured by the time keeper 112 has reached the time set by the time setter, whether or not to correct the time measured by the time keeper 112.

Figure 2B:
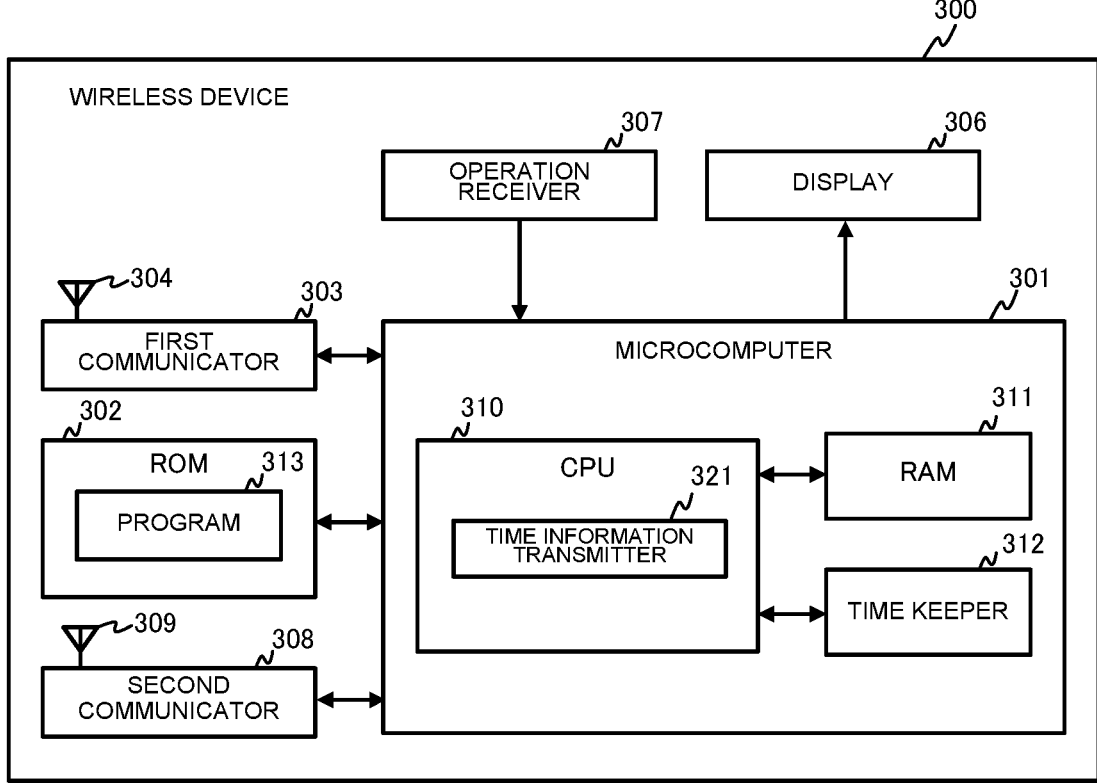
FIG. 2B is a block diagram illustrating the configuration of a wireless device according to Embodiment 1.

Next, the hardware configuration of the wireless device 300 according to Embodiment 1 is described. As illustrated in FIG. 2B, the wireless device 300 includes, as a hardware configuration, a microcomputer 301, a ROM 302, a first communicator (short-range wireless communicator) 303 including an antenna 304, a display 306, an operation receiver 307, and a second communicator (carrier communicator) 308 including an antenna 309. In one example, the wireless device 300 is a smartphone that includes a mobile phone function.

The microcomputer 301 includes a CPU 310 as a processor, a RAM 311 as a memory, a time keeper 312, and the like. Note that the RAM 311 and the time keeper 312 may be provided outside the microcomputer 301. Additionally, the ROM 302, the first communicator 303, and the second communicator 308 may be provided in the microcomputer 301.

The CPU 310 is a processor that carries out various types of arithmetic processing and overall control of all operations of the wireless device 300. The CPU 310 reads control programs from the ROM 302 and loads the control programs into the RAM 311 to carry out various types of operation processing, such as arithmetic controlling and displaying related to various types of functions. In one example, the CPU 310 controls the first communicator 303 in accordance with a control program to establish a communication connection with the electronic timepiece 100, transmit information to the electronic timepiece 100, and/or receive information from the electronic timepiece 100. Furthermore, the CPU 310 controls the second communicator 308 to carry out wireless communication with a base station, for example.

The RAM 311 is volatile memory such as SRAM or DRAM. The RAM 311 stores temporary data, various types of setting data, and the like.

The time keeper 312 includes an oscillation circuit, a frequency dividing circuit, a time keeping circuit, and the like, and measures the current time. Note that the time keeping 312 may be configured from software that changes a value stored in the RAM 311 every predetermined amount of time (for example, every one second), or may be configured from dedicated hardware.

The ROM 302 is nonvolatile memory such as mask ROM or flash memory. Control programs, initial setting data, and the like are stored in the ROM 302. The control programs include a program 313 related to the control of the various types of processing for controlling wireless communication with the electronic timepiece 100, the control of the various types of processing for wirelessly communicating with the base station, and the like.

In one example, the first communicator (short-range wireless communicator) 303 includes a radio frequency (RF) circuit and/or a baseband (BB) circuit, and a memory circuit. The first communicator 303 demodulates and/or decrypts the wireless signals received via the antenna 304, and transmits these wireless signals to the CPU 310. Moreover, the first communicator 303 encrypts and/or modulates signals sent from the CPU 310, and transmits these signals out via the antenna 304. In one example, the first communicator 303 is realized by a Bluetooth (registered trademark) controller that carries out BLE-based transmitting and receiving of wireless signals.

In one example, as with the first communicator 303, the second communicator (carrier communicator) 308 includes a radio frequency (RF) circuit and/or a baseband (BB) circuit, and a memory circuit. The second communicator 308 carries out wireless communication with the base station via the antenna 309.

In one example, the display 306 includes a display panel such as a liquid crystal display or an organic electroluminescence (EL) display, a driver for outputting, on the basis of a control signal from the microcomputer 301 and to the display panel, a drive signal corresponding to the type of display panel, and the like. In one example, the display 306 displays information received from the electronic timepiece 100.

The operation receiver 307 receives input operations from the user and outputs electronic signals, corresponding to the input operations, to the microcomputer 301. For example, a configuration is possible in which a touch sensor as the operation receiver 307 is laminated on the display panel of the display 306, thereby forming both a touch panel together with the display panel.

Next, the functional configuration of the CPU 310 of the wireless device 300 is described. The CPU 310 mainly functions as a time information transmitter 321. The functions of the time information transmitter 321 may be realized by a processor other than the microcomputer 301. For example, the functions of the time information transmitter 321 may be realized by the CPU of the first communicator 303.

When the CPU 310 as the time information transmitter 321 controls the first communicator 303 to receive a signal requesting the transmission of the time information from the electronic timepiece 100, the CPU 310 as the time information transmitter 321 transmits, to the electronic timepiece 100, the time information held by the time keeper 312 or the time information stored in the ROM 302 or the RAM 311. Alternatively, the CPU 310 as the time information transmitter 321 acquires the correct time from the base station via the second communicator 308, and transmits the acquired time information to the electronic timepiece 100.

Figure 3:
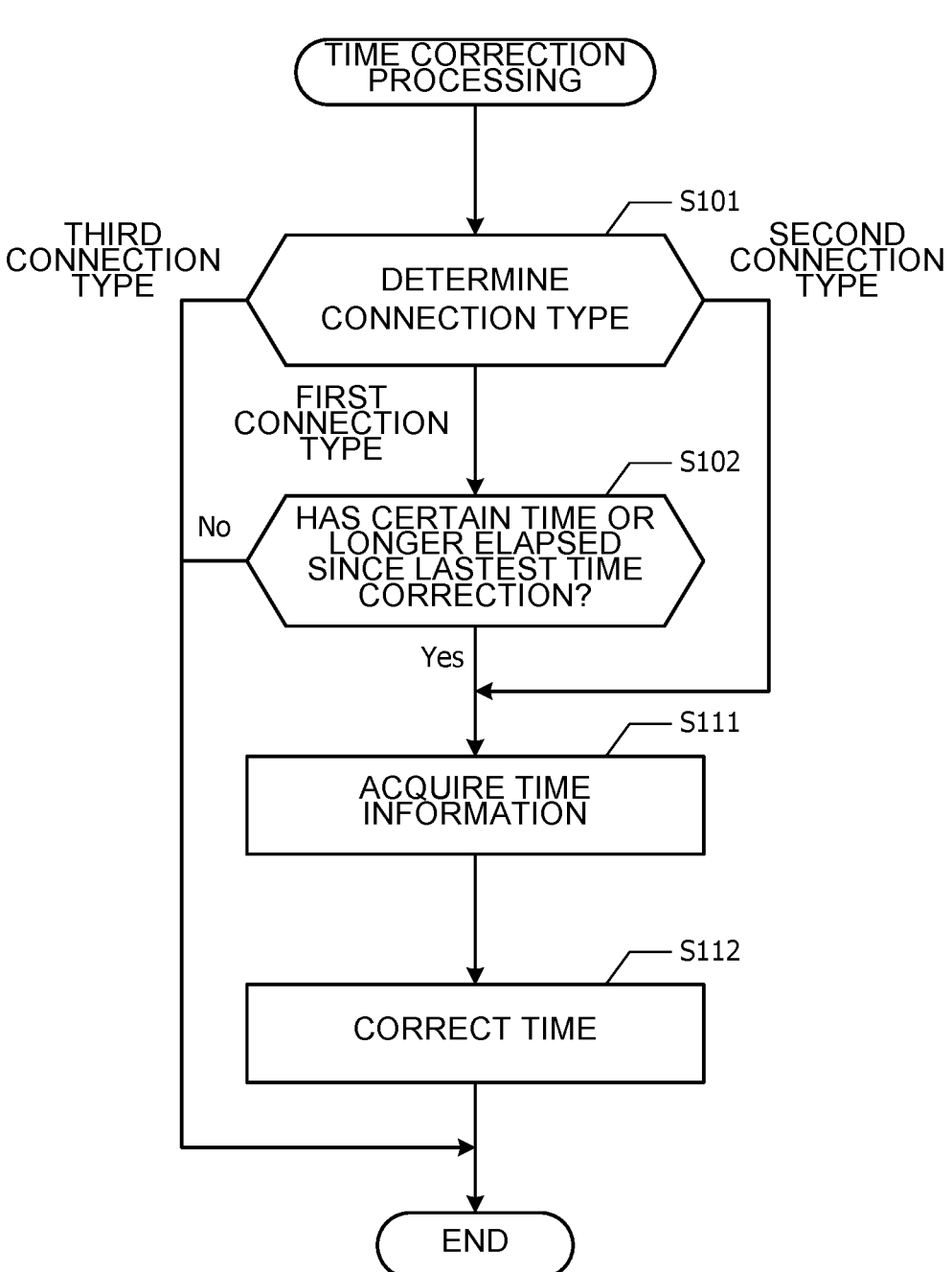
FIG. 3 is an example of a flowchart of time correction processing executed by a CPU of the electronic timepiece according to Embodiment 1.

Next, the operations of the electronic timepiece 100 according to Embodiment 1 are described while referencing FIG. 3. FIG. 3 is an example of a flowchart illustrating the flow of time correction processing executed by the CPU 110 of the electronic timepiece 100. The CPU 110 starts the time correction processing with the establishment of a communication connection with the wireless device 300 as a trigger.

In steps S101 and S102, which are first and second determination steps, the CPU 110 determines whether or not to correct the time measured by the time keeper 112. Specifically, in the first determination step S101, the CPU 110 determines which connection type the establishment of the communication connection is classified as. In a case in which the electronic timepiece 100 is set to the always connected mode and the communication connection is established as a result of recovering from a link loss, the CPU 110 determines that the connection type corresponds to a first connection type, and executes step S102.

Note that, in a case in which it is preferable that the time information of the electronic timepiece 100 is corrected immediately when the communication connection is established, the CPU 110 determines that the connection type corresponds to a second connection type, and executes step S111. Additionally, in a case in which it is not necessary to correct the time information of the electronic timepiece 100 when the communication connection is established, the CPU 110 determines that the connection type corresponds to a third connection type, and ends the processing. Details of the second and third connection types are described later.

In the second determination step S102, the CPU 110 determines whether or not a certain amount of time or longer (for example, 24 hours or longer) has elapsed since the time information was most recently corrected in the past. In a case in which the certain amount of time or longer has elapsed since the time information was most recently corrected (step S102; YES), step S111 is executed. In a case in which the certain amount of time or longer has not elapsed since the time information was most recently corrected (step S102; NO), the processing is ended. Note that the determination of whether the certain amount of time or longer has elapsed since the time information was most recently corrected may be made on the basis of the time measured by the time measurer 122 (see FIG. 2A), or may be made on the basis of the time set by the time setter.

In step S111, which is a first correction step (acquisition step), the CPU 110 acquires time information from the wireless device 300. Specifically, the CPU 110 transmits a signal to the wireless device 300 via the communicator 103 requesting transmission of the time information. When the CPU 310 as the time information transmitter 321 (see FIG. 2B) of the wireless device 300 receives, from the electronic timepiece 100, the signal requesting transmission of the time information, the CPU 310 transmits the time information held by the wireless device 300 to the electronic timepiece 100. The CPU 110 receives the time information transmitted from the wireless device 300, thereby acquiring time information that is more correct (for example, that is closer to Japan Standard Time).

In step S112, which is a second correction step, the CPU 110 corrects the time measured by the time keeper 112 on the basis of the time information acquired from the wireless device 300. In addition, the CPU 110 corrects information related to the time information that is stored or set in the ROM 102, the RAM 111, or the like. Then, the CPU 110 ends the time correction processing.

An operation by the CPU 110 such as that described above enables a configuration in which the time information is not corrected every time a communication connection with the wireless device 300 is established (recovered from a link loss). Additionally, the power related to wireless communication that is consumed by the electronic timepiece 100 and the wireless device 300 and, furthermore, the power related to time correction of the time keeper 112 of the electronic timepiece 100 can be suppressed.

Note that, a configuration is possible in which the CPU 110 determines whether the establishment of a communication connection is a recovery from a link loss or is not a recovery from a link loss (for example, when a connection is established for the first time between the electronic timepiece 100 and the wireless device 300, or the like) and, if the establishment of the communication connection is not a recovery from a link loss, the CPU 110 determines that correction of the time information of the electronic timepiece 100 is needed without executing the time correction processing flow described above.

In the wireless communication system 1, the electronic timepiece 100 may not always be set to always connected mode. It is possible that the communication connection between the electronic timepiece 100 and the wireless device 300 is normally disconnected.

In such a case, the user may perform an operation, via the operation receiver 107, for immediately correcting the time information of the electronic timepiece 100. In this case, it is preferable that the electronic timepiece 100 establishes a communication connection with the wireless device 300 to acquire time information that is more correct from the wireless device 300. At this time, since the user performed the operation for immediately correcting the time information of the electronic timepiece 100, it is not appropriate to make a determination about whether or not to correct the time information.

In a case in which a communication connection is established due to the user performing an operation for immediately correcting the time information of the electronic timepiece 100, the CPU 110 determines that the connection type corresponds to the second connection type in step S101. Then, the CPU 110 executes step S111 and then S112 without executing step S102, and corrects the time measured by the time keeper 112. An operation by the CPU 110 such as that described above makes it possible for the user to correct, at a desired timing, the time information of the electronic timepiece 100 to time information that is more correct.

Note that, there may be cases in which there is no need to correct the time information of the electronic timepiece 100, even when a communication connection is established between the electronic timepiece 100 and the wireless device 300. For example, the wireless communication system 1 can realize remote operation functions for controlling the operations of the wireless device 300 on the basis of operations of the electronic timepiece 100. The remote operation functions include a function for causing the wireless device 300 to emit a sound on the basis of an operation of the electronic timepiece 100. In a case in which a communication connection is established to realize such a remote operation function, the CPU 110 determines that the connection type corresponds to the third connection type in step S101. Then, the CPU 110 ends the time correction processing without correcting the time information.

An operation by the CPU 110 such as that described above makes it possible to appropriately perform time correction of the electronic timepiece 100 while suppressing power consumption. Note that the classifications of the connection types of the communication connections can be appropriately selected. For example, in the always connected mode, it is thought that link losses are resolved within a short amount of time in many cases. As such, the establishment of a communication connection due to recovery from a link loss may be classified as the third connection type.

Typically, the electronic timepiece 100 has a mode for operating with low power consumption. This mode is called "sleep mode." For example, if motion (acceleration or angular velocity) is not detected for a certain amount of time or longer, the electronic timepiece 100 may transition to the sleep mode, and attempt to reduce power consumption by stopping various functions, including the functions related to wireless communication. In the sleep mode, the communication connection between the electronic timepiece 100 and the wireless device 300 is disconnected. However, if the electronic timepiece 100 detects a motion, the electronic timepiece 100 recovers from the sleep mode and establishes a communication connection with the wireless device 300. The establishment of a communication connection due to recovery from the sleep mode is preferably classified as the first connection type, for example, but may be classified as the second or third connection type.

Alternate Example of Embodiment 1

Figure 4:
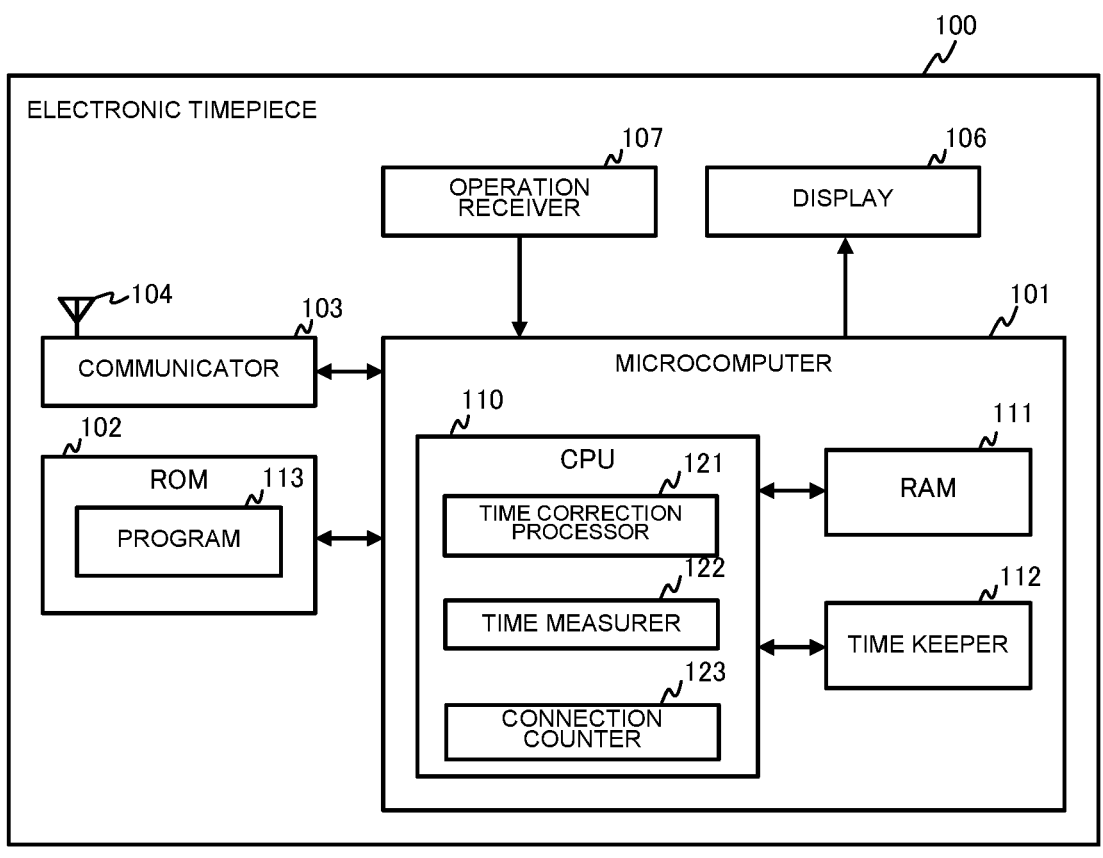
FIG. 4 is a block diagram illustrating the configuration of an electronic timepiece according to an alternate example of Embodiment 1.

As illustrated in FIG. 4, as the functional configuration, the CPU 110 of the electronic timepiece 100 may include a function as a connection counter 123 in addition to the time correction processor 121 and the time measurer 122. In this case, the CPU 110 as the connection counter 123 executes a count operation for counting a number of times that communication connections between the electronic timepiece 100 and the wireless device 300 have been established since the time information was most recently corrected. For example, when the time information is corrected, "0" is written in a number of connections storage region of the RAM 111, and "1" is added to the value stored in the number of connections storage region when subsequent communication connections are established. Thus, the number of times that communication connections have been established is counted.

When functioning as the time correction processor 121, the CPU 110 references the number of times, counted by the connection counter 123, that communication connections have been established. Then, the CPU 110 determines, on the basis of that number of times, whether or not to correct the time measured by the time keeper 112. For example, in a case in which the number of times is 100 or greater, the CPU 110 determines to correct the time measured by the time keeper 112 and, in a case in which the number of times is less than 100, the CPU 110 determines to not correct the time measured by the time keeper 112.

Figure 5:
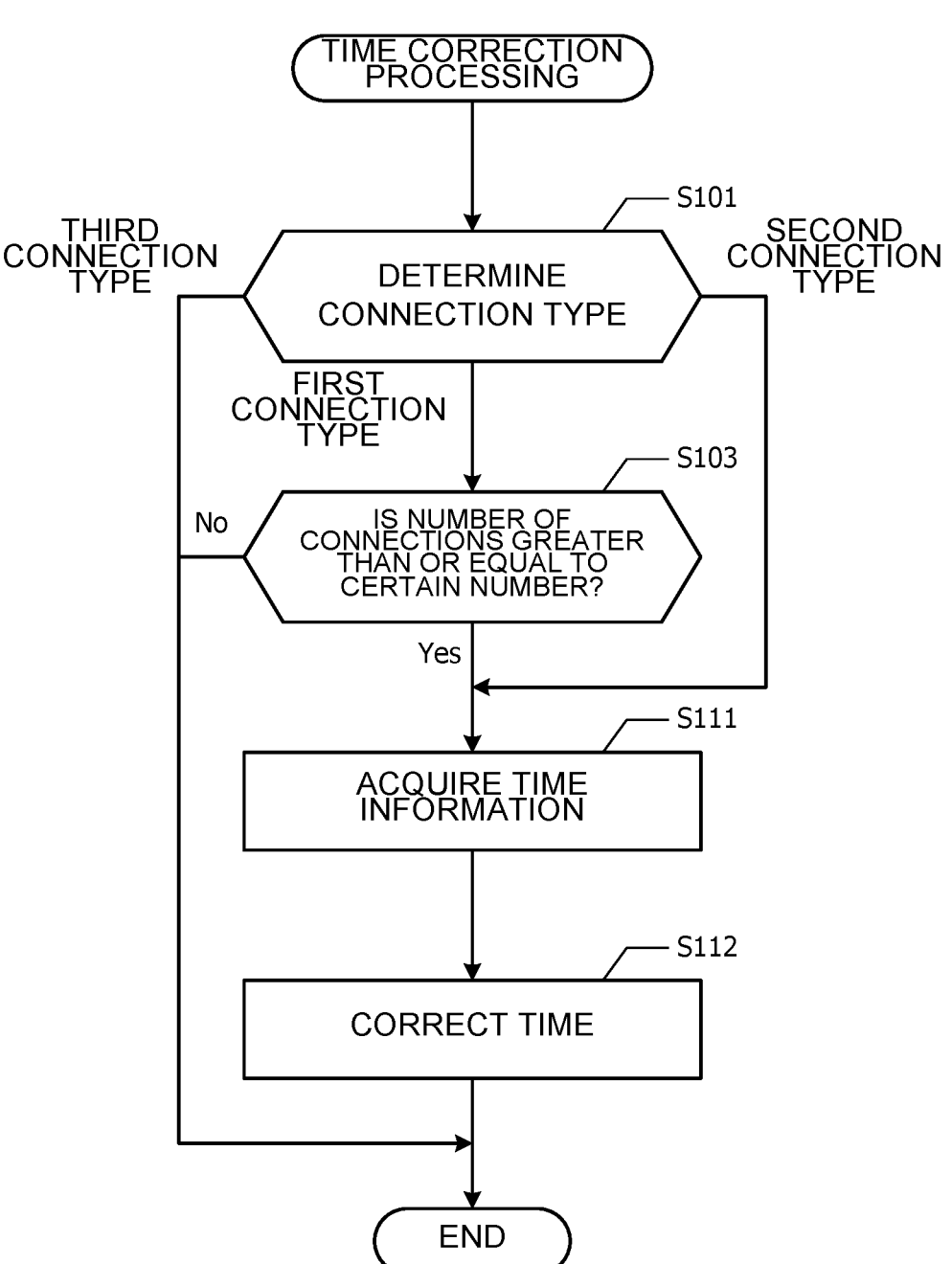
FIG. 5 is an example of a flowchart of time correction processing executed by a CPU of the electronic timepiece according to the alternate example of Embodiment 1.

FIG. 5 is an example of a flowchart illustrating another flow of the time correction processing executed by the CPU 110 of the electronic timepiece 100. The CPU 110 starts this processing with the establishment of the communication connection with the wireless device 300 as a trigger.

In the first determination step S101, the CPU 110 determines which connection type the establishment of the communication connection is classified as. In a case in which the electronic timepiece 100 is set to the always connected mode and the communication connection is established as a result of recovering from a link loss, the CPU 110 determines that the connection type corresponds to a first connection type, and executes step S103.

In step S103, which is a third determination step, the CPU 110 determines whether or not the number of times that communication connections have been established since the time information was most recently corrected in the past is greater than or equal to a certain number. If the number of times that communication connections have been established is greater than or equal to the certain number (step S103; YES), step S111 and step S112 are executed and the time measured by the time keeper 112 is corrected. If the number of times that communication connections have been established is less than the certain number (step S103; NO), the processing is ended.

An operation by the CPU 110 such as that described above enables a configuration in which the time information is not corrected every time a communication connection with the wireless device 300 is established (recovered from link loss).

Embodiment 2

In Embodiment 1, the electronic timepiece 100 independently executes the time correction processing with the establishment of a communication connection between the electronic timepiece 100 and the wireless device 300 as a trigger. However, a configuration is possible in which, when a communication connection is established, the wireless device 300 transmits a signal to the electronic timepiece 100 inquiring about the necessity of time correction, and the electronic timepiece 100 executes the time correction processing with the receipt of that signal as a trigger. Hereinafter, as Embodiment 2, a wireless communication system 2 is described in which, when a communication connection is established, the wireless device 300a transmits a signal to the electronic timepiece 100a inquiring about the necessity of time correction.

Figure 6A:
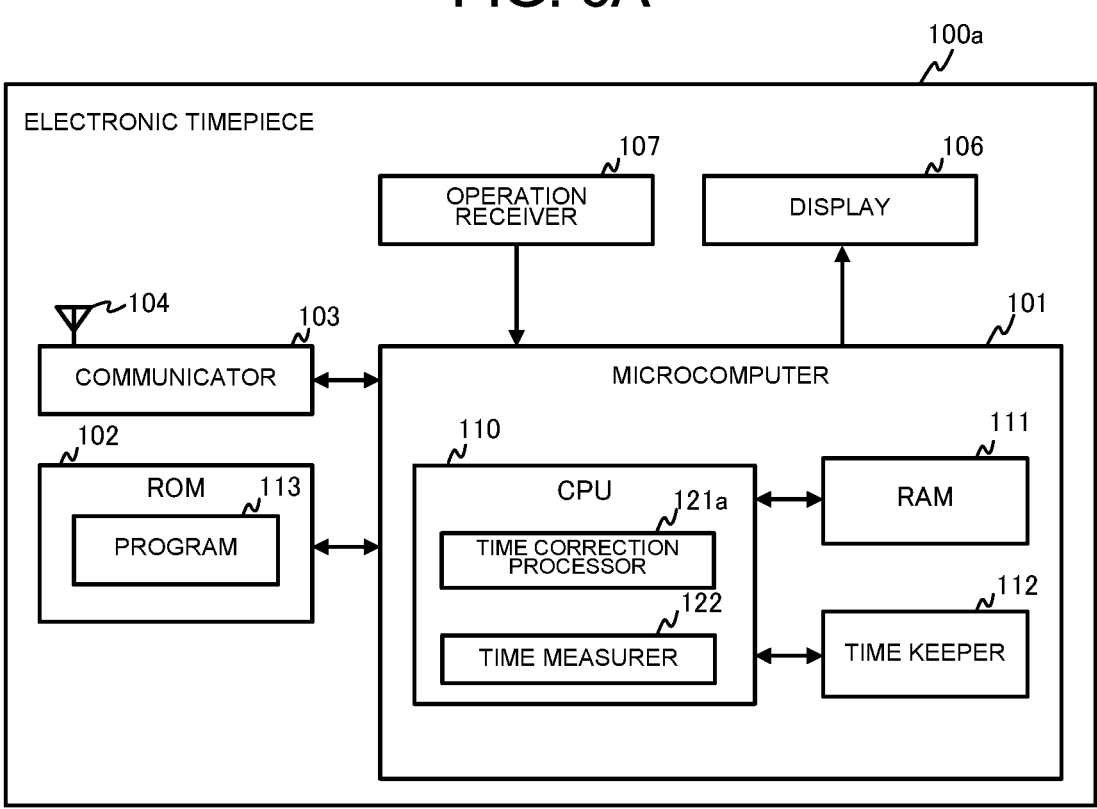
FIG. 6A is a block diagram illustrating the configuration of an electronic timepiece according to Embodiment 2.

As illustrated in FIG. 1, the wireless communication system 2 according to Embodiment 2 includes an electronic timepiece 100a and a wireless device 300a. As illustrated in FIG. 6A, the hardware configuration of the electronic timepiece 100a according to Embodiment 2 is the same as that of the electronic timepiece 100 according to Embodiment 1. Additionally, as illustrated in FIG. 6B, the hardware configuration of the wireless device 300a is the same as that of the wireless device 300 according to Embodiment 1.

As illustrated in FIG. 6A, the CPU 110 of the electronic timepiece 100a according to Embodiment 2 mainly functions as a time correction processor 121a and the time measurer 122. The CPU 110 of Embodiment 2 differs from that of Embodiment 1 in that the CPU 110 of Embodiment 2 functions as the time correction processor 121a instead of as the time correction processor 121.

The CPU 110 as the time correction processor 121 according to Embodiment 1 executes a determination operation for determining whether or not to correct the time measured by the time keeper 112 with the establishment of a communication connection with the wireless device 300 as a trigger, and starts the time correction processing illustrated in FIG. 3. However, after a communication connection is established with the wireless device 300a, the CPU 110 as the time correction processor 121a according to Embodiment 2 executes a determination operation with the reception, from the wireless device 300a, of an inquiry signal inquiring about the necessity of time correction as a trigger, and starts the time correction processing illustrated in FIG. 3.

Figure 6B:
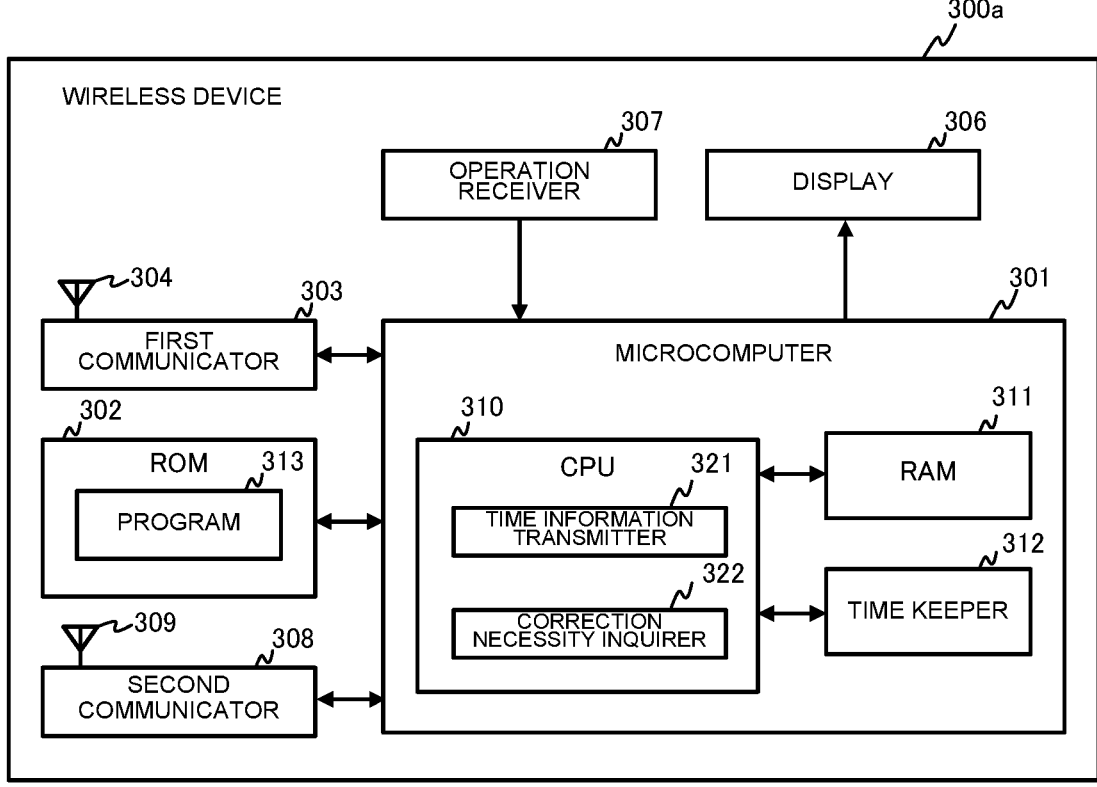
FIG. 6B is a block diagram illustrating the configuration of a wireless device according to Embodiment 2.

As illustrated in FIG. 6B, the CPU 310 of the wireless device 300a according to Embodiment 2 mainly functions as the time information transmitter 321 and a correction necessity inquirer 322. The CPU 310 according to Embodiment 2 differs from that of Embodiment 1 in that the CPU 310 according to Embodiment 2 functions as the correction necessity inquirer 322 in addition to the time correction processor 321.

The CPU 310 as the correction necessity inquirer 322 controls the first communicator 303 to establish a communication connection with the electronic timepiece 100a and, thereafter, transmits an inquiry signal inquiring about the necessity of time correction to the electronic timepiece 100a. The electronic timepiece 100a that receives the inquiry signal executes the determination operation with the reception of the inquiry signal as a trigger, and starts the time correction processing illustrated in FIG. 3.

With the wireless communication system 2 according to Embodiment 2 as well, it is possible to appropriately perform time correction of the electronic timepiece 100a while suppressing power consumption. Note that the CPU 110 of the electronic timepiece 100a according to Embodiment 2 may also include, as a functional configuration, the connection counter 123 (see FIG. 4) described in the alternate example of Embodiment 1.

Embodiment 3

In Embodiment 1, when a communication connection is established between the electronic timepiece 100 and the wireless device 300, the electronic timepiece 100 independently determines whether or not to correct the time information of the electronic timepiece 100. However, a configuration is possible in which, when a communication connection is established, the wireless device 300 determines whether or not to correct the time information held by the electronic timepiece 100. Hereinafter, as Embodiment 3, a wireless communication system 3 is described in which, when a communication connection is established, a wireless device 300b determines whether or not to perform time correction of an electronic timepiece 100b.

Figure 7A:
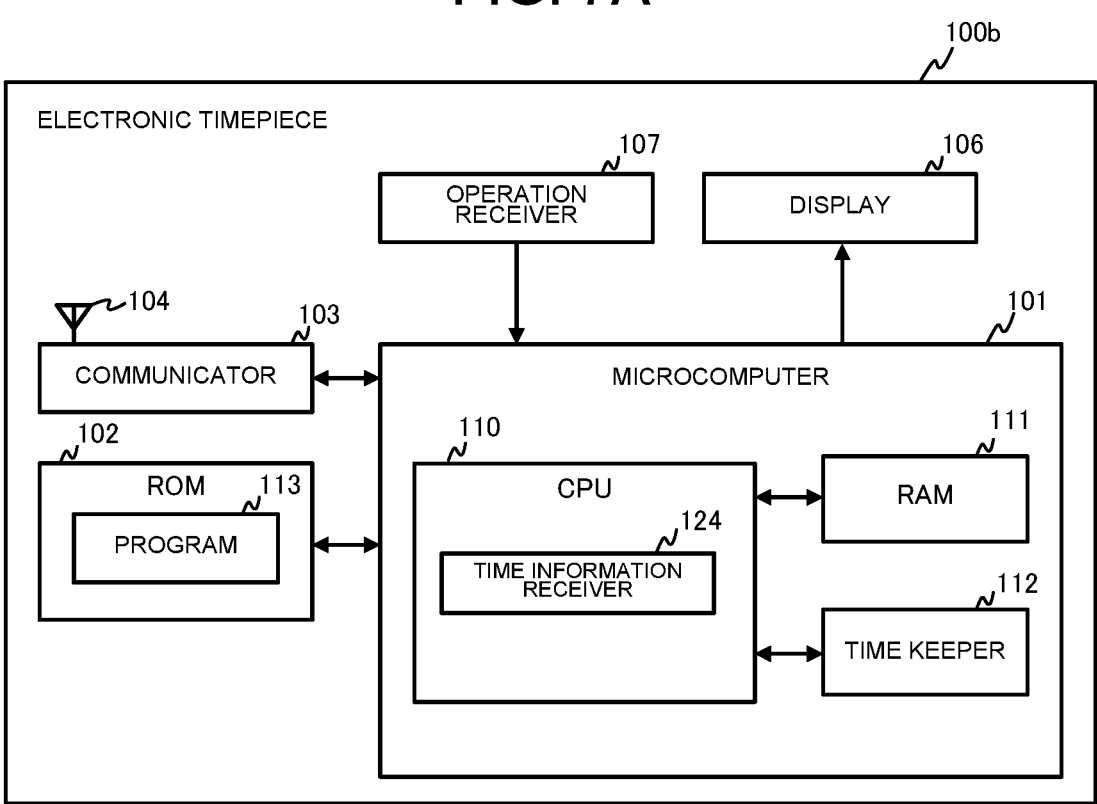
FIG. 7A is a block diagram illustrating the configuration of an electronic timepiece according to Embodiment 3.

As illustrated in FIG. 1, the wireless communication system 3 according to Embodiment 3 includes the electronic timepiece 100b and the wireless device 300b. As illustrated in FIG. 7A, the hardware configuration of the electronic timepiece 100b according to Embodiment 3 is the same as that of the electronic timepiece 100 according to Embodiment 1. Additionally, as illustrated in FIG. 7B, the hardware configuration of the wireless device 300b is the same as that of the wireless device 300 according to Embodiment 1.

As illustrated in FIG. 7A, the CPU 110 of the electronic timepiece 100b mainly functions as a time information receiver 124. The CPU 110 as the time information receiver 124 controls the communicator 103 to receive the time information transmitted from the wireless device 300b, and corrects the time measured by the time keeper 112 on the basis of that time information.

Figure 7B:
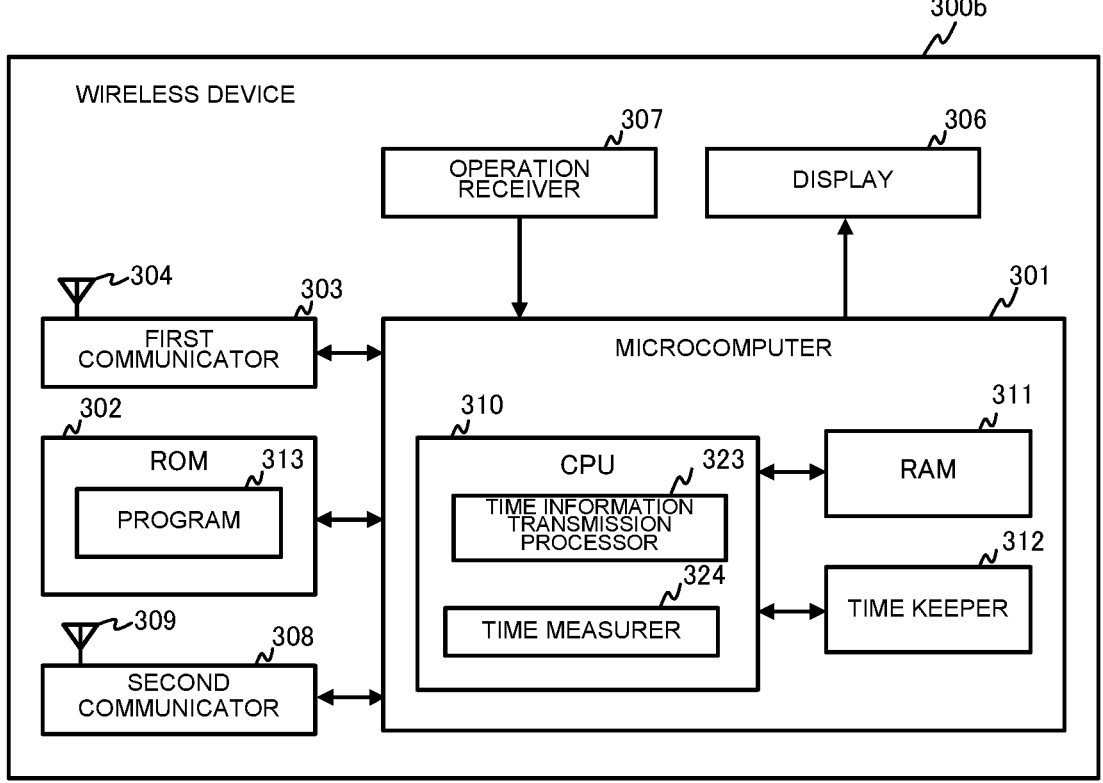
FIG. 7B is a block diagram illustrating the configuration of a wireless device according to Embodiment 3.

As illustrated in FIG. 7B, the CPU 310 of the wireless device 300b mainly functions as a time information transmission processor 323 and a time measurer 324. The CPU 310 as the time information transmission processor 323 firstly controls the first communicator 303 to establish a communication connection with the electronic timepiece 100b and, when the communication connection is established, executes a determination operation for determining whether or not to correct the time information held by the electronic timepiece 100b. In a case in which the CPU 310 determines to correct the time information held by the electronic timepiece 100b, the CPU 310 executes a transmission operation for transmitting the time information held by the wireless device 300b to the electronic timepiece 100b.

The CPU 310 as the time measurer 324 measures an amount of time that has elapsed since the time information was most recently transmitted to the electronic timepiece 100b in the past. For example, when the time information is transmitted to the electronic timepiece 100b, "0" is written in an elapsed time storage region of the RAM 311, and "1"

is added to the value stored in the elapsed time storage region each time one second elapses. As a result, the amount of time that has elapsed since the time information was most recently transmitted to the electronic timepiece 100*b* is measured.

When functioning as the time information transmission processor 323, the CPU 310 references the elapsed time, measured by the time measurer 324, since the time information was most recently transmitted to the electronic timepiece 100*b*. Then, the CPU 310 determines, on the basis of the elapsed time, whether or not to transmit the time information held by the wireless device 300*b* to the electronic timepiece 100*b*.

Note that the time measurer 324 may be replaced with a time setter. The CPU 310 as the time setter sets a time corresponding to a future point in time when the time information is transmitted to the electronic timepiece 100*b*. For example, a time 24 hours after the time information is transmitted is set. In a case in which the time measurer 324 is replaced with the time setter, when the CPU 310 functions as the time information transmission processor 323, the CPU 310 determines, on the basis of whether or not the current time measured by the time keeper 312 has reached the time set by the time setter, whether or not to transmit the time information held by the wireless device 300*b* to the electronic timepiece 100*b*.

Figure 8:
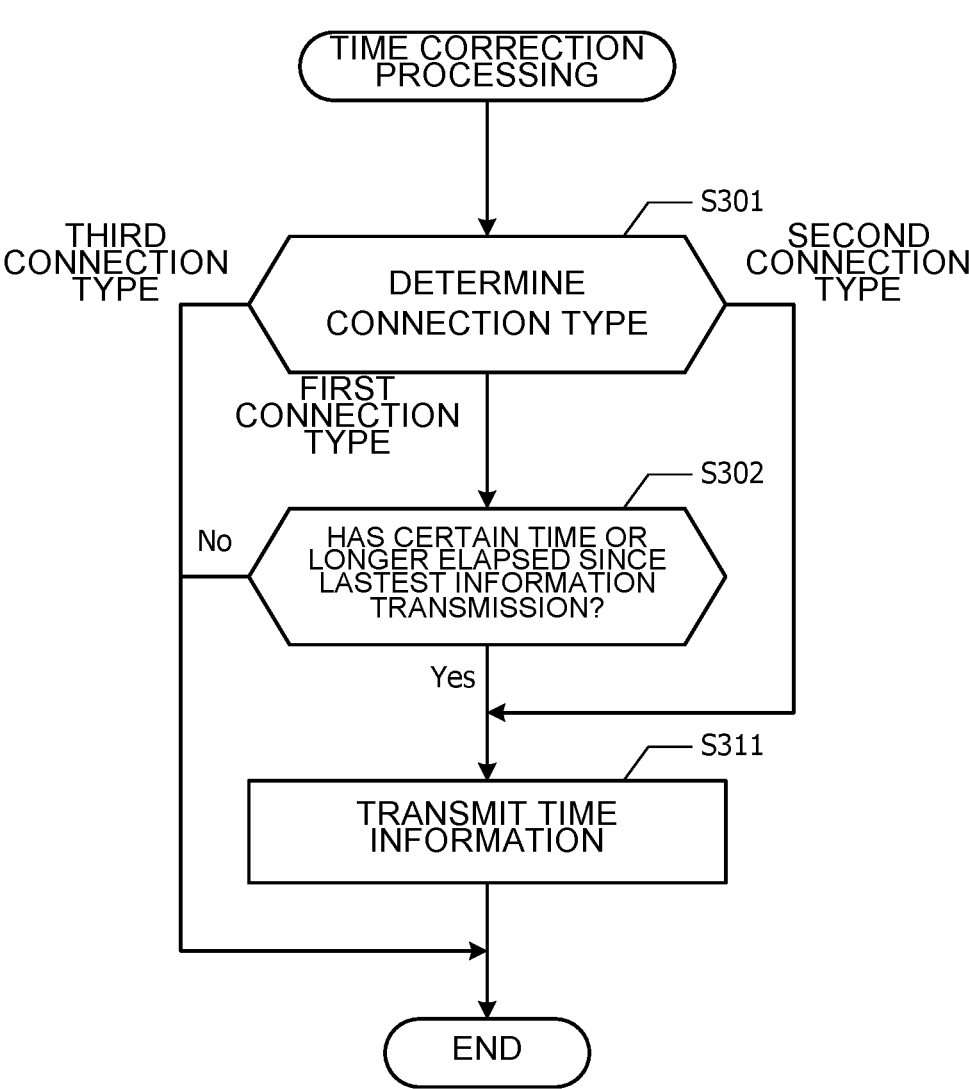
FIG. 8 is an example of a flowchart of time information transmission processing executed by a CPU of the electronic timepiece according to Embodiment 3.

Next, the operations of the wireless device 300*b* according to Embodiment 3 are described while referencing FIG. 8. FIG. 8 is an example of a flowchart illustrating the flow of time information transmission processing executed by the CPU 310 of the wireless device 300*b* according to Embodiment 3. The CPU 310 starts the time information transmission processing with the establishment of a communication connection with the electronic timepiece 100*b* as a trigger.

In steps S301 and S302, the CPU 310 determines whether or not to perform time correction of the electronic timepiece 100*b*. Specifically, in step S301, the CPU 310 determines which connection type the establishment of the communication connection is classified as. For example, in a case in which the electronic timepiece 100*b* is set to the always connected mode and the communication connection is established as a result of recovering from link loss, the CPU 310 determines that the connection type corresponds to the first connection type, and executes step S302. Additionally, for example, in a case in which a communication connection is established as a result of the user performing an operation for immediately correcting the time information of the electronic timepiece 100*b*, the CPU 310 determines that the connection type corresponds to the second connection type, and executes step S311. Furthermore, in a case in which it is not necessary to correct the time information of the electronic timepiece 100*b*, the CPU 310 determines that the connection type corresponds to the third connection type, and ends the processing.

Note that, in step S301, the CPU 310 may control the first communicator 303 to transmit, to the electronic timepiece 100*b*, a signal inquiring about the connection type to which the establishment of the communication connection corresponds. Then, the CPU 310 may determine, on the basis of a response from the electronic timepiece 100*b* to the inquiry signal, which communication type the establishment of the communication connection is classified as.

Next, in step S302, the CPU 310 determines whether or not a certain amount of time or longer (for example, 24 hours or longer) has elapsed since the time information was most recently transmitted to the electronic timepiece 100*b* in the past. In a case in which the certain amount time or longer has elapsed since the time information was most recently transmitted (step S302; YES), step S311 is executed. In a case in which the certain amount of time or longer has not elapsed since the time information was most recently transmitted (step S302; NO), the time information transmission processing is ended. Note that the determination of whether the certain amount of time or longer has elapsed since the time information was most recently transmitted may be made on the basis of an amount of time that is started to be measured from when the time information was most recently transmitted, or on the basis of whether or not the current time has reached a time set when the time information was most recently transmitted.

In step S311, the CPU 310 transmits, to the electronic timepiece 100*b*, the time information held by the wireless device 300*b*. The time information may be time information held by the time keeper 312, or may be time information stored in the ROM 302 or the RAM 311. Alternatively, the time information may be time information acquired from the base station via the second communicator 308.

Then, the CPU 310 ends the time information transmission processing. The electronic timepiece 100*b* corrects the time information held by the electronic timepiece 100*b* on the basis of the time information acquired from the wireless device 300*b*.

With the wireless communication system 3 according to Embodiment 3 as well, it is possible to appropriately perform time correction of the electronic timepiece 100*b* while suppressing power consumption. Note that, the CPU 310 of the wireless device 300*b* according to Embodiment 3 may also include, as a functional configuration, the connection counter 123 (see FIG. 4) described in the alternate example of Embodiment 1.

Description of Connection Interval

As described above, immediately after a communication connection is established between the electronic timepiece 100, 100*a*, 100*b* and the wireless device 300, 300*a*, 300*b*, the connection interval (time interval of wireless communication) is set to a relatively short interval (for example, a 50 ms interval). When correcting the time information of the electronic timepiece 100, 100*a*, 100*b*, the time information and a large amount of information related to the time information must be exchanged between the electronic timepiece 100, 100*a*, 100*b* and the wireless device 300, 300*a*, 300*b*. As such, it is preferable that the time correction of the electronic timepiece 100, 100*a*, 100*b* be performed immediately after the establishment of the communication connection having the short connection interval.

In the always connected mode, after the communication connection is established and the necessary information is exchanged, the connection interval is set to a longer interval (for example, a 300 ms interval) in order to suppress power consumption. At this time, a signal requesting elongation of the connection interval is transmitted from the electronic timepiece 100, 100*a*, 100*b* to the wireless device 300, 300*a*, 300*b*.

In a case in which time correction of the electronic timepiece 100, 100*a*, 100*b* is performed while the connection interval is set to the long interval in the always connected mode, it is necessary to exchange information between the electronic timepiece 100, 100*a*, 100*b* and the wireless device 300, 300*a*, 300*b* at more frequent timings. As such, the connection interval is set to a shorter interval. At this time, a signal requesting shortening of the connection interval is transmitted from the electronic timepiece 100, 100*a*, 100*b* to the wireless device 300, 300*a*, 300*b*.

Even if a signal requesting elongation or shortening of the connection interval is received from the electronic timepiece 100, 100a, 100b, there are cases in which, due to various causes, the wireless device 300, 300a, 300b does not accept that request. In such a case, a certain amount of time is waited and, then, that signal is transmitted a plurality of times from the electronic timepiece 100, 100a, 100b to the wireless device 300, 300a, 300b. In a case in which, even after being transmitted a plurality of times, the request is not accepted by the wireless device 300, 300a, 300b, the change of the connection interval is canceled or the communication connection is disconnected.

In one example, when changing the connection interval, the electronic timepiece 100, 100a, 100b and the wireless device 300, 300a, 300b perform communication such as that described above.

Other Alternate Examples

In the embodiments described above, the wireless device 300, 300a, 300b is described as being a smartphone that includes a mobile phone function. However, the wireless device 300, 300a, 300b is not limited to a smartphone, and may be any device that is capable of performing short-range wireless communication with the electronic timepiece 100, 100a, 100b. For example, an electronic device that includes a short-range wireless communication function such as a personal computer (PC), a personal digital assistant (PDA), a tablet terminal, a wearable terminal, or the like can be used instead of a smartphone.

In the embodiments described above, examples are described in which the CPU 110, 310 performs control operations. However, the control operations are not limited to software control by the CPU 110, 310. Part or all of the control operations may be realized using hardware components such as dedicated logic circuits.

Additionally, in the foregoing description, an example is described in which the ROM 102, 302, constituted by nonvolatile memory such as flash memory, is used as a non-transitory computer-readable medium on which the program 113, 313 is stored. However, the non-transitory computer-readable medium is not limited thereto, and a portable storage medium such as a hard disk drive (HDD), a flexible disc, a compact disc read-only memory compact disk (CD-ROM), a digital versatile disc (DVD), a magneto-optical (MO) disc, a memory card, and a universal serial bus (USB) memory may be used. Additionally, a carrier wave may be used in the present disclosure as a medium for providing, over a communication line, data of the programs according to the present disclosure Note that, the present disclosure is not limited to the embodiments described above and various modifications are possible. In addition, the specific details such as the con-figurations, the control procedures, and the like described in the embodiments may be appropriately modified without departing from the scope of the invention of the present disclosure.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. An electronic timepiece comprising:

a radio frequency circuit configured to be controlled to communicate wirelessly with a wireless device, and receive time information from the wireless device; and at least one processor configured to:

measure a current time;

perform first correction to correct the current time measured;

control the radio frequency circuit to establish a com-munication connection with the wireless device;

in response to recognizing a first link loss of the communication connection with the wireless device, control the radio frequency circuit to re-establish the communication connection with the wireless device at least a first time;

after re-establishing the communication connection the at least the first time:

determine that a predetermined time has not elapsed since performing the first correction to correct the current time measured; and in response to determining that the predetermined time has not elapsed since performing the first correction to correct the current time measured, not control the radio frequency circuit to acquire time information for correcting the current time from the wireless device;

recognize a subsequent link loss of the communication connection with the wireless device, the subsequent link loss occurring after the first link loss;

in response to recognizing the subsequent link loss, control the radio frequency circuit to re-establish the communication connection with the wireless device a subsequent time; and after re-establishing the communication connection with the wireless device the subsequent time:

determine that the predetermined time has elapsed since performing the first correction to correct the current time measured; and in response to determining that the predetermined time has elapsed since performing the first correc-tion to correct the current time measured, control the radio frequency circuit to acquire the time information from the wireless device; and correct the current time measured based on the time information acquired.

2. The electronic timepiece according to claim 1, wherein:

the radio frequency circuit is configured to operate in an always-on communication connection mode wherein the communication connection with the wireless device is always maintained to be connected; and the at least one processor is configured to recognize the first link loss as a loss of the communication connection occurring during the always-on communication con-nection mode.

3. The electronic timepiece according to claim 1, wherein the at least one processor is further configured to:

receive an operation performed by a user for immediately correcting the time measured by the processor; and in response to the user performed operation, control the radio frequency circuit to acquire the time information from the wireless device; and correct the current time measured based on the time information acquired.

4. The electronic timepiece according to claim 2, wherein the processor is configured to, when the link loss occurs, continuously emit an advertising signal requesting establishment of a communication connection to the wireless device.

5. The electronic timepiece according to claim 1, wherein the at least one processor performs, during the establishment of the communication connection, communication with the wireless device via the radio frequency circuit at a predetermined time interval of 1000 ms or less.

6. A time correction method executed by an electronic timepiece configured to communicate wirelessly with a wireless device, wherein the electronic timepiece comprises:

a radio frequency circuit configured to be controlled to communicate wirelessly with a wireless device, and receive time information from the wireless device; and at least one processor, and wherein the time correction method comprises, performing by the at least one processor:

measuring a current time;

performing first correction to correct the current time measured;

controlling the radio frequency circuit to establish a communication connection with the wireless device;

in response to recognizing a first link loss of the communication connection with the wireless device, controlling the radio frequency circuit to re-establish the communication connection with the wireless device at least a first time;

after re-establishing the communication connection the at least the first time:

determining that a predetermined time has not elapsed since performing the first correction to correct the current time measured; and in response to determining that the predetermined time has not elapsed since performing the first correction to correct the current time measured, not controlling the radio frequency circuit to acquire time information for correcting the current time from the wireless device;

recognizing a subsequent link loss of the communication connection with the wireless device, the subsequent link loss occurring after the first link loss;

in response to recognizing the subsequent link loss, controlling the radio frequency circuit to re-establish the communication connection with the wireless device a subsequent time; and after re-establishing the communication connection with the wireless device the subsequent time:

determining that the predetermined time has elapsed since performing the first correction to correct the current time measured; and in response to determining that the predetermined time has elapsed since performing the first correction to correct the current time measured, controlling the radio frequency circuit to acquire the time information from the wireless device; and correcting the current time measured based on the time information acquired.

7. The time correction method according to claim 6, wherein:

the radio frequency circuit is configured to operate in an always-on communication connection mode wherein the communication connection with the wireless device is always maintained to be connected; and the time correction method further comprises recognizing the first link loss as a loss of the communication connection occurring during the always-on communication connection mode.

8. A non-transitory recording medium that stores a program for causing at least one processor of an electronic timepiece to perform a method comprising:

measuring a current time;

performing first correction to correct the current time measured;

controlling a radio frequency circuit to establish a communication connection with a wireless device;

in response to recognizing a first link loss of the communication connection with the wireless device, controlling the radio frequency circuit to re-establish the communication connection with the wireless device at least a first time;

after re-establishing the communication connection the at least the first time:

determining that a predetermined time has not elapsed since performing the first correction to correct the current time measured; and in response to determining that the predetermined time has not elapsed since performing the first correction to correct the current time measured, not controlling the radio frequency circuit to acquire time information for correcting the current time from the wireless device;

recognizing a subsequent link loss of the communication connection with the wireless device, the subsequent link loss occurring after the first link loss;

in response to recognizing the subsequent link loss, controlling the radio frequency circuit to re-establish the communication connection with the wireless device a subsequent time; and after re-establishing the communication connection with the wireless device the subsequent time:

determining that the predetermined time has elapsed since performing the first correction to correct the current time measured; and in response to determining that the predetermined time has elapsed since performing the first correction to correct the current time measured, controlling the radio frequency circuit to acquire the time information from the wireless device; and correcting the current time measured based on the time information acquired.

9. An electronic timepiece comprising:

a radio frequency circuit configured to be controlled to communicate wirelessly with a wireless device, and receive time information from the wireless device; and at least one processor configured to:

measure a current time;

perform first correction to correct the current time measured;

control the radio frequency circuit to establish a communication connection with the wireless device;

in response to recognizing a first link loss of the communication connection with the wireless device, control the radio frequency circuit to re-establish the communication connection with the wireless device at least a first time;

after re-establishing the communication connection with the wireless device at the least the first time:

count a number of times the communication connection with the wireless device has been re-established since performing the first correction to correct the current time measured;

determine that the counted number of times is less than a predetermined number; and in response to determining that the counted number of times is less than the predetermined number, not control the radio frequency circuit to acquire time information for correcting the current time from the wireless device;

recognize a subsequent link loss of the communication connection with the wireless device, the subsequent link loss occurring after the first link loss;

in response to recognizing the subsequent link loss, control the radio frequency circuit to re-establish the communication connection with the wireless device a subsequent time; and after re-establishing the communication connection with the wireless device the subsequent time:

count the number of times the communication connection with the wireless device has been re-established since performing the first correction;

determine that the counted number of times is greater than or equal to the predetermined number;

in response to determining that the counted number of times is greater than or equal to the predetermined number, control the radio frequency circuit to acquire the time information from the wireless device; and correct the current time measured based on the acquired time information.

10. A time correction method executed by an electronic timepiece configured to communicate wirelessly with a wireless device, wherein the electronic timepiece comprises:

a radio frequency circuit configured to be controlled to communicate wirelessly with a wireless device, and receive time information from the wireless device; and at least one processor, and wherein the time correction method comprises, performing by the at least one processor:

measuring a current time;

performing first correction to correct the current time measured;

controlling the radio frequency circuit to establish a communication connection with the wireless device;

in response to recognizing a first link loss of the communication connection with the wireless device, controlling the radio frequency circuit to re-establish the communication connection with the wireless device at least a first time;

after re-establishing the communication connection with the wireless device the at least the first time:

counting a number of times the communication connection with the wireless device has been re-established since performing the first correction to correct the current time measured;

determining that the counted number of times is less than a predetermined number; and in response to determining that the counted number of times is less than the predetermined number, not controlling the radio frequency circuit to acquire time information for correcting the current time from the wireless device;

recognizing a subsequent link loss of the communication connection with the wireless device, the subsequent link loss occurring after the first link loss;

in response to recognizing the subsequent link loss, controlling the radio frequency circuit to re-establish the communication connection with the wireless device a subsequent time; and after re-establishing the communication connection with the wireless device the subsequent time:

counting the number of times the communication connection with the wireless device has been re-established since performing the first correction;

determining that the counted number of times is greater than or equal to the predetermined number;

in response to determining that the counted number of times is greater than or equal to the predetermined number, controlling the radio frequency circuit to acquire the time information from the wireless device; and correcting the current time measured based on the acquired time information.

11. A non-transitory recording medium that stores a program for causing a processor of an electronic timepiece to perform a method comprising:

measuring a current time;

performing first correction to correct the current time measured;

controlling a radio frequency circuit to establish a communication connection with a wireless device;

in response to recognizing a first link loss of the communication connection with the wireless device, controlling the radio frequency circuit to re-establish the communication connection with the wireless device at least a first time;

after re-establishing the communication connection with the wireless device the at least the first time:

counting a number of times the communication connection with the wireless device has been re-established since performing the first correction to correct the current time measured;

determining that the counted number of times is less than a predetermined number; and in response to determining that the counted number of times is less than the predetermined number, not controlling the radio frequency circuit to acquire time information for correcting the current time from the wireless device;

recognizing a subsequent link loss of the communication connection with the wireless device, the subsequent link loss occurring after the first link loss;

in response to recognizing the subsequent link loss, controlling the radio frequency circuit to re-establish the communication connection with the wireless device a subsequent time; and after re-establishing the communication connection with the wireless device the subsequent time:

counting the number of times the communication connection with the wireless device has been re-established since performing the first correction;

determining that the counted number of times is greater than or equal to the predetermined number;

in response to determining that the counted number of times is greater than or equal to the predetermined number, controlling the radio frequency circuit to acquire the time information from the wireless device; and

correcting the current time measured based on the acquired time information.

* * * * *